Aug. 13, 1940.    T. W. KENYON ET AL    2,210,916
AUTOMATIC PILOT FOR DIRIGIBLE CRAFT
Original Filed April 5, 1938    2 Sheets-Sheet 2
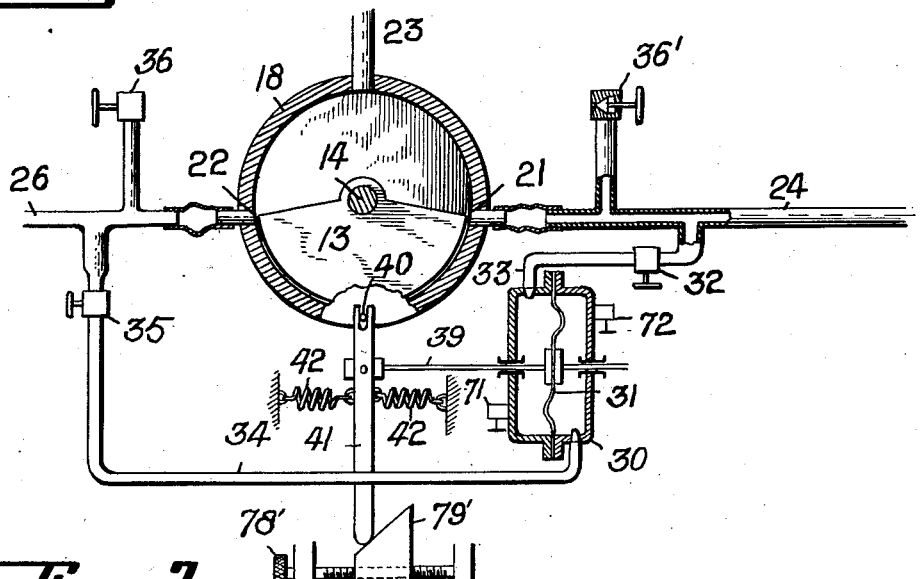
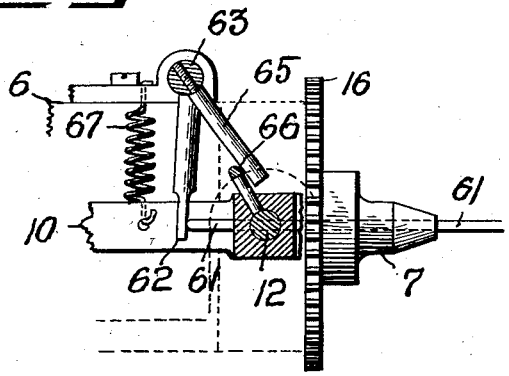
INVENTORS
THEODORE W. KENYON
STEPHEN J. ZAND
BY
THEIR ATTORNEY Patented Aug. 13, 1940

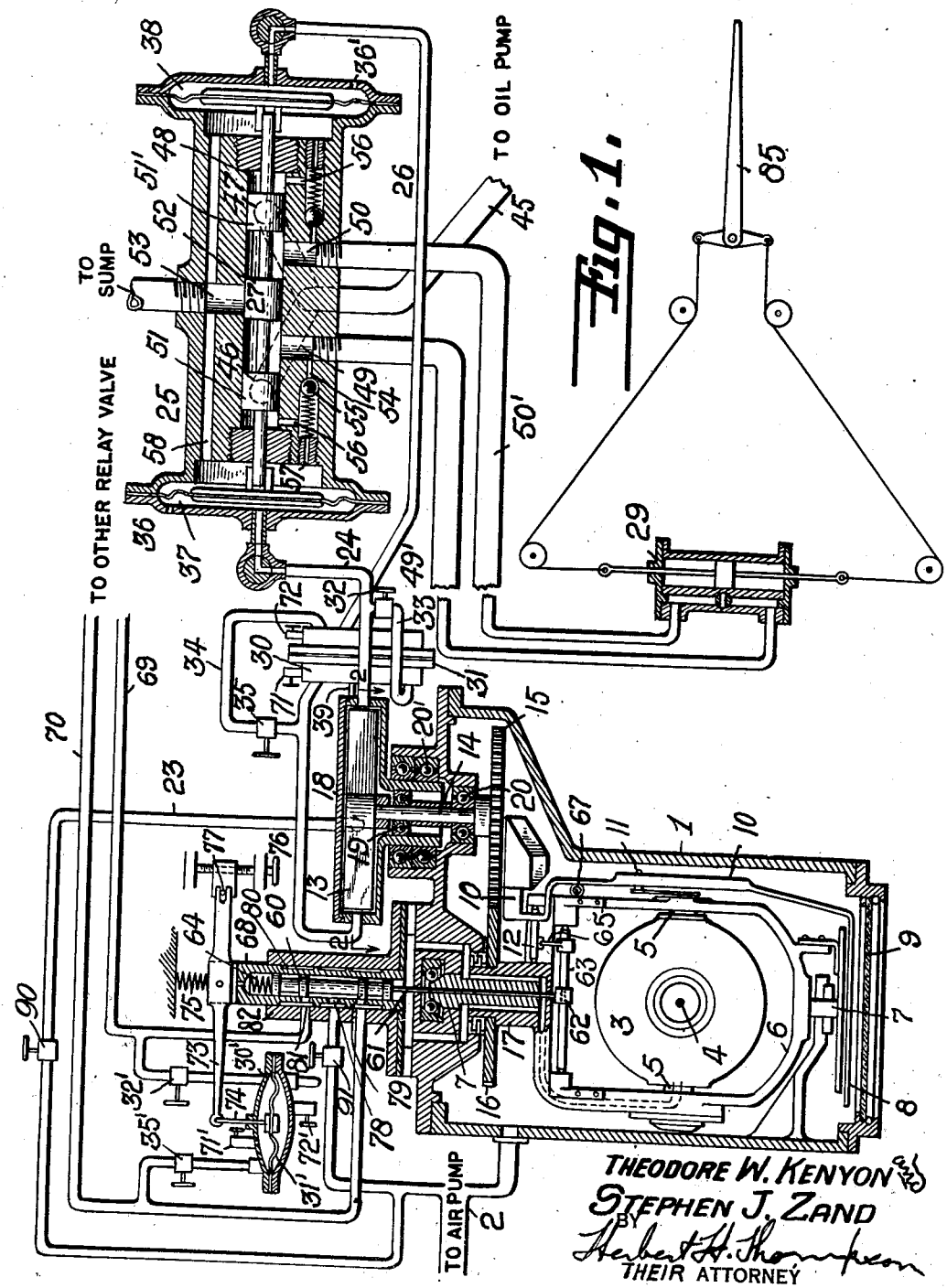

2,210,916

UNITED STATES PATENT OFFICE 2,210,916

AUTOMATIC PILOT FOR DIRIGIBLE CRAFT

Theodore W. Kenyon, Huntington, and Stephen J. Zand, Forest Hills, N. Y., assignors to Sperry Gyroscope Company, Inc., Brooklyn, N. Y., a corporation of New York Application April 5, 1938, Serial No. 200,084
Renewed June 20, 1939

17 Claims. (Cl. 244—78)

This invention relates to automatic pilots for dirigible craft, and is especially adapted for airplanes. Our invention has special application to the type of automatic pilot shown in our prior application for Reactive servo system for automatic pilots, Serial No. 149,136, filed June 19, 1937, although it is likewise applicable to other types of automatic pilots, especially of the fluid operated type.

In the system shown in our aforesaid application, a gyroscope responsive to angular velocity of the craft is used in addition to the positional gyroscope for controlling the signal to the relay valve, so as to discontinue the control signal or impulse before the airplane has returned to its original position, in order to prevent "hunting" or unquenched oscillations of the craft due to its angular momentum.

According to our present invention, we eliminate the necessity for employing this extra gyroscope about each axis of control, or at least about the two horizontal axes of control, as is usually secured from a gyro vertical or artificial horizon, and we employ instead a simple differential pressure follow-back or shut-off device operable with a time lag, which slowly removes the primary signal before the airplane returns to its original position, before it would otherwise be removed by the return movement of the airplane.

A further object of our invention is to improve the differential air pick-offs from the gyro vertical or artificial horizon so that a standard form of horizon may be employed and the pick-off devices both mounted at the rear of the casing of the horizon gyroscope. By this means the construction is simplified and standardized and the size and weight reduced.

Referring to the drawings:

Fig. 1 is a diagrammatic view of our control as applied to one axis of the airplane (in this instance the fore and aft axis or aileron control) parts of the gyroscope being shown in horizontal section, the relay valve in vertical section, and the control surface and servo motor on a greatly reduced scale as compared to the other parts of the figure.

Fig. 2 is a section of one of the pick-off valves of Fig. 1, taken approximately on line 2—2 of Fig. 1, the follow-back differential pressure device adjacent thereto also being in section.

Fig. 3 is a detail, in elevation, of the linkage for controlling the other pick-off valve in Fig. 1.

We have shown our invention as applied to a standard gyroscopic horizon or gyro vertical, normally used only as an indicator on aircraft. The standard gyroscopic artificial horizon assumes the form shown in Fig. 1, the same being enclosed within a casing 1, from which air is normally continuously pumped through a pipe 2. Said gyroscope is shown as in the form of a rotor bearing casing 3, carrying the rotor on a normally vertical spinning axis 4, the casing being trunnioned on transverse axis 5 in gimbal ring 6, the gimbal ring being in turn trunnioned on fore and aft axis 7 in the casing 1. The horizon indicator of such a gyroscope is usually in the form of a horizontal bar 8 visible through the front window 9 and mounted on rearwardly extending arm 10, as more completely described in the prior patent to B. G. Carlson #1,982,636, dated December 4, 1934, for Air driven gyro verticals. Said bar is moved up and down on pitching of the craft by a crank pin 11 on trunnion 5 on the rotor casing, extending through the gimbal ring, while the said bar, being pivoted by a pin 12 on the gimbal ring, rocks laterally therewith on roll or bank of the craft.

For picking off the banking control, we have shown a valve member in the form of a substantially semicircular segment 13 mounted on a shaft 14 journalled at the rear and outside of casing 1 in bearings 19 and 20, which is turned from the gyroscope by means of a gear 15 mounted on shaft 14, which gear meshes with a gear 16 secured to the extension 17 from the gimbal ring 6. Said segment 13 is enclosed in a housing or casing 18 which is also rotatably mounted about the axis of shaft 14, as by means of bearings 19 and 20'.

Ports 21 and 22 are provided in the opposite sides of said casing, which are normally closed to an equal extent by the segment 13 (see Fig. 2). The interior of casing 18 is preferably not connected with the interior of the casing 1, but a separate exhaust pipe 23 is connected therewith so that air is continuously exhausted therefrom at a constant rate. It will readily be seen, therefore, that upon relative tilting of the craft and gyroscope, ports 21 and 22 will be differentially uncovered, resulting in a rise in pressure in one pipe 24 leading to relay valve 25, and in a fall in pressure in the other pipe 26 leading to said valve, the pipes being shown as connected to diaphragmed chambers 37 and 38 at opposite ends of said relay valve to differentially displace the piston valve 27 thereof which controls the flow of oil to the main servo cylinder 29, as more completely described in our prior application No. 149,136.

Our improved device for preventing oscillations consists of a differential pressure responsive chamber or cylinder 30 having a diaphragm 31 or other piston device dividing the chamber into two compartments, each of which has an adjustable leak 71 or 72. One side of said chamber is connected to the pipe 24 through a variable throttle valve 32 and pipe 33, while the other side is connected to the pipe 26 through throttle valve 35 and pipe 34. Variable leaks 36 and 36' are provided somewhere in the pipe connections 24 and 26 or in the chambers 37 and 38 of the relay valve, so that continuous air flow is produced through both pipes unless one of ports 21 or 22 is closed, the pressure in the pipes being inversely proportional to the relative amount of opening of ports 21 and 22.

Diaphragm 31 is connected to the housing 18 as by means of piston rod 39 and lever 41, the forked end of which is engaged by a pin 40 on casing 18, so that movement of the diaphragm will rotate the housing 18 around the member 13, thereby operating to restore the ports to the balanced position, the housing 18 being normally centralized by opposed springs 42.

In operation, as long as the aircraft maintains its proper attitude no relative movement occurs between the two parts of the pick-off valve 13—18. Hence there is no pressure difference in pipes 24 and 26 or on the two sides of the diaphragm 31. Assuming that one wing is depressed, the casing 18 will be rotated with respect to the segment 13, resulting in an immediate differential pressure being established in the pipes 24 and 26 to move the piston 27 of the relay valve 25. As soon as this occurs, however, pressure will start to build up in one side of the chamber 30 and to fall in the other side at a rate dependent on the adjustment of the throttle valves 32 and 35, so that after a time determined in accordance with the time constant of the device for the particular setting of the throttle valve at the time, which valves in turn are set in accordance with the characteristic period of the craft, depending on the moment of inertia and most used velocity of the craft, the diaphragm will move the casing 18 in a direction to reduce the signal and, in fact, to completely remove or even reverse the signal before the airplane returns to its original attitude, thus effectively damping oscillations of the craft.

The relative effectiveness of applicants' device as a damper may be said to depend primarily on the relative time lag interposed between the initiation of the primary signal and the shutting off of the same by the device as compared to the angular rate of movement or period of the craft at the time. In other words, an out-of-phase relation is introduced by the device between the primary impulse and the follow-up action of the device, which, for any given valve setting, is a minimum for very slow movements of the craft and increased for more rapid movements, which is of course desirable. Our invention also has the effect of desensitizing the pick-off device due to its follow-up action, which is the complement of its action as a damper. In case the airplane is turning very slowly, for instance, and the valves are not too far closed, the diaphragm 31 will move practically in phase with the primary signal or the rudder and therefore will have its maximum effect as a desensitizer, since it tends to shut off and thereby reduce the signal almost immediately. On the other hand, under these circumstances it has its minimum effect as a damper, since it operates almost in phase with the signal. When, however, a rapid turn is taking place with the valves restricted, the differential signal changes much more rapidly than the pressure can change on the two sides of the bellows 31, so that the effect of the device as a desensitizer is greatly reduced but its effect as a damper or anticipator is increased. Our invention therefore acts somewhat as a rate device or as a rate gyroscope, which it displaces or supplements, and its proportional effect on the system is readily adjusted by varying the opening of the needle valves 32, 35, which of course varies the time constant or relaxation period of the device. To the extent indicated, therefore, our invention superimposes a rate control upon a strictly displacement control in addition to its function as an anticipator or damper.

The relay valve is shown as equipped with the hydraulic follow-back system described in our aforesaid application, by which the necessity for follow-back cables from the control surface 85 is eliminated. Oil pressure is supplied to the valve from pipe 45, said pipe being connected to a pair of ports 46 and 47 in the wall of the cylinder bore 48. Alternative outlet ports are shown at 49 and 50, leading through pipes 49' and 50' to opposite ends of the servo cylinder 29. Piston valve 27 is shown as having three piston 51, 51' and 52. In the position shown in Fig. 1, both intake ports are closed and the common outlet port 53 to the sump is also closed, but it will readily be seen that movement of the piston to the left will connect the intake port 46 to port 49 and the outlet port 53 to port 50, while movement in the opposite direction will connect intake port 47 to port 50 and outlet port 53 to port 49.

Also connected to each of the ports 49 and 50 is a restricted bypass passage 54 which, may, if desired, be normally closed by spring pressed ball 55 or other valve, which passage communicates through a port 56 with the cylinder bore beyond the piston 51. A greatly restricted orifice 57 may also be provided, connecting passage 54 and port 56 with the return passage 58, which is connected to the return port 53. Neither balls 55 nor restricted orifices 57 are, however, necessary for the simplest design. This construction results in limiting the rudder throw by the dynamic air pressure thereon, so that the rudder movement is proportional to both course deviation and, inversely, to air speed, and it cooperates with the follow-back device at the gyroscope previously described, in producing a very sensitive control but without unwanted oscillations.

As pointed out in our prior application Ser. No. 149,136, in our servo motor system the oil pressure supplied to the servo motor is at all times proportional to the effective differential air pressure supplied thereto. Therefore, by varying the air pressure, the operating oil pressure may be changed at will, and hence the amount of rudder movement may be regulated at will since in our system the rudder moves until the back pressure of the air thereon equals the pressure of the oil. A convenient means of regulating the air pressure is by inserting a throttle valve 90 in the air line leading to the vacuum pump. We have shown such a valve in the pipe 23 and a similar valve 91 in the pipe connection to the piston valve 60. By adjusting these valves, the pressure supplied to the chambers 37, 38 is varied, and therefore the pressure supplied to the servo motor is varied since the moment the oil pressure supplied to the servo motor rises slightly above the proportional air pressure exerted on the stem of valve 27, said valve shuts off. According to our invention, therefore, no oil throttle or speed valves or pressure reducing bypass valve in the oil line need be employed, the amount of rudder throw being regulated by an air valve or valves in the vacuum supply line.

The control about the pitch axis of the craft may be identical in principle to that already described with respect to the bank axis. In order, however, to place both pick-offs at the rear of the gyro casing without changing materially the construction of the standard gyroscope, we use a piston or slide valve arrangement as the pitch pick-off means, having the movable member in the form of a piston valve 60 and a small piston rod 61 which slides through a hole in the center of the trunnion 7 and abuts at its rear end against an arm 62 depending from a shaft 63 pivoted on gimbal ring 6 (Fig. 3). Said shaft is provided with a second depending arm 65, against which normally bears the end of a small rocker arm 66 secured to the pin or shaft 12 which carries the horizon arm 10. Therefore, if the horizon arm is moved up and down by the crank pin 11 engaging a slot therein, the shaft 12 will be rocked and move the arm 65 in a counter-clockwise direction, the opposite movement of the arm being brought about by a light spring 64, which maintains the two arms in contact. Said spring, however, exerts no force on the gyroscope because it is counterbalanced by a second spring 67 extending between gimbal ring 6 and the arm 10.

The follow-up in this instance is secured by making the housing or cylinder 68 for the piston 60 also slidable, and controlling its movements by a diaphragm 31' operable, in the same manner as diaphragm 31, from the differential pressure in the pipes 69 and 70 leading from the valve to the pitch relay. As before, throttle valves 32' and 35' and adjustable leaks 71' and 72' are provided. The sleeve or cylinder 68 is provided with the usual ports 78 cooperating with the several pistons 79 on the piston valve 60 in the usual manner. The ports 78 merge into elongated annular channels 80 in the outer surface of the sleeve 68 which register with ports 81 in the stationary housing 82 regardless of the limited movement of the sleeve. In this instance the diaphragm is connected to the sleeve 68 through a lever 73 and link 74, the lever being shown as pivoted on the sleeve and having a spring 75 behind the same.

Manual adjustment of the angle of pitch may be secured by turning the thumb screw 76, which also moves the lever 73 through a pin and slot connection 77. For the manual control of the banking, there is shown a similar thumb screw 78' which moves laterally a cam 79' to rock the lever 41 for adjusting the position of the casing 18.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

Having described our invention, what we claim and desire to secure by Letters Patent is:

1. In an automatic pilot having a position maintaining instrument, a fluid pressure pick-off means including a valve member and ported housing member, the former of which is movable with said instrument, a fluid pressure relay valve connected to the ports in said housing, and a delayed action differential pressure device slowly responsive to the effective pressure supplied to the relay, and causing said other member to slowly follow the first mentioned member to reduce or take off the signal to the relay.

2. In an automatic pilot having a position maintaining instrument, a differential air flow pick-off means including a valve member and ported housing, said valve being movable with said instrument, a relay valve connected to the ports in said housing, and a delayed action differential pressure device slowly responsive to said ports and relay through restricted orifices, and differentially connected to said pick-off means to reduce or take off the signal to said relay.

3. In an automatic pilot for aircraft having position maintaining means, a differential air flow pick-off valve device thereat, a pneumatic-hydraulic relay valve actuated from the air flow pressure created by said device, a delayed action differential air pressure device slowly subject to the effective air pressure supplied to said relay for restoring said device to its neutral position, a hydraulic servo motor controlled by said relay, and means associated with said relay subject to the pressure in said servo motor for restoring said relay to neutral position.

4. In an automatic pilot having a position maintaining instrument, a fluid pressure pick-off means including a valve member and ported housing, one of which is movable with said instrument, a fluid pressure device connected to the ports in said housing, a delayed action differential pressure device in the connections between said ports and fluid pressure device, and causing said housing to slowly follow said valve member to reduce or take off the signal to the fluid pressure device, and manual means also for altering the position of said housing to change the attitude of the craft.

5. An air flow pick-off for both axes of a gyroscopic artificial horizon mounted within its casing with its major axis fore and aft and its minor axis athwartships, and having a horizon bar, a rotary valve on the back of said casing for controlling the actuation of the ailerons, and having a shaft projecting through the casing rotated by relative movements of the gyroscope about said fore and aft axis, a piston valve also on the back of said casing having a piston rod projecting with said casing along said fore and aft axis, and means connecting said bar and rod for axially sliding said rod upon relative up and down movement of said bar.

6. An air flow pick-off for both axes of a gyroscopic artificial horizon mounted within its casing with its major axis fore and aft and its minor axis athwartships, a rotary valve on the back of said casing for actuating the ailerons, and having a shaft projecting through the casing rotated by relative movements of the gyroscope about said fore and aft axis, a piston valve also on the back of said casing having a piston rod projecting with said casing along said fore and aft axis, and means for axially sliding said rod upon relative movements of the gyroscope about its athwartship axis.

7. An air flow pick-off for a sensitive position maintaining gyroscope having a casing, comprising a piston valve slidably mounted on said casing, a rock shaft on the gyroscope, means connecting said shaft and gyroscope to rock the former on relative movement of the gyroscope and craft, an arm on said shaft and a piston rod connecting said arm and piston to slide the latter, said housing having ports for differentially varying the air pressure to a servo motor.

8. An air flow pick-off for gyroscopes as claimed in claim 7, in which a ported sleeve is provided for said piston valve and follow-back means for adjusting said sleeve.

9. An air flow pick-off for the pitch axis of a gyroscopic artificial horizon mounted within its casing with its major axis fore and aft and its minor axis athwartships, and having a horizon bar, a piston valve on the back of said casing having a piston rod projecting within said casing along said fore and aft axis, means connecting said bar and rod for axially sliding said rod upon relative up and down movement of said bar, a ported sleeve for said piston rod, and manual means for adjusting said sleeve to alter the angle of attack of the craft.

10. In a fluid pressure automatic pilot for aircraft, a control instrument, a differential air flow pick-off thereat, fluid pressure servo means for controlling a control surface of the craft, and a relay valve between said servo means and pick-off subject both to the differential pressure created by said pick-off and the counter fluid pressure in said servo means, whereby the effective pressure supplied to the servo means may be adjusted by varying the effective air flow pressure.

11. In a fluid pressure automatic pilot for aircraft, a control instrument, a differential air flow pick-off thereat, fluid pressure servo means for controlling a control surface of the craft, a relay valve between said servo means and pick-off subject both to the differential pressure created by said pick-off and the counter fluid pressure in said servo means, and an adjustable valve in the air supply, whereby the effective pressure supplied to the servo means may be varied by adjusting said valve.

12. In an automatic pilot having a position maintaining instrument, a differential air flow pick-off means thereon giving alone differential air pressure signals proportional to displacement, and a slow acting device connected to said means and actuated from said signals which reduces the magnitude of said signals at a rate varying inversely with the rate of change of said signal, whereby the signal supplied to said device varies with both displacement and rate of change of displacement.

13. In an automatic pilot having a position maintaining instrument, a differential air flow pick-off means thereon giving alone differential air pressure signals proportional to displacement, and a slow acting device for reducing the effective displacement at said pick-off, including a chamber having a movable wall connected to said pick-off and connected through restrictions to said signals, whereby the signal varies with both displacement and rate of change of displacement.

14. In an automatic pilot having a position maintaining instrument, a differential air flow pick-off means creating a differential signal pressure in two pipe connections in response to relative turning of said instrument and craft, a relay connected to said connections to be adjusted by said signal, a second differential pressure device connected to said connections through restricted orifices, and means connecting said device and pick-off means to introduce a readjustment of said means varying with the rate of turn.

15. In an automatic pilot having a position maintaining instrument, a fluid pressure pick-off means including a valve member and ported housing member, one of which is movable with said instrument, a fluid pressure relay connected to the ports in said housing member, and a delayed action differential pressure device in the connections between said ports and relay, and causing the other of said members to slowly follow the first mentioned member to reduce or take off the signal to the relay.

16. In an automatic pilot having a position maintaining instrument, a differential air flow pick-off means creating a differential signal pressure in two pipe connections in response to relative turning of said instrument and craft, a relay connected to said connections to be adjusted by said signal, a second differential pressure device connected to said connections through restricted orifices, and a follow-back connection between said second device and said pick-off means operating out of phase with its primary movements an amount varying with the rate of change of differential pressure in said pipes.

17. In a fluid pressure automatic pilot for aircraft, a control instrument, a source of air under pressure, a differential air flow pick-off thereat, hydraulic servo means for controlling a control surface of the craft, a relay valve between said servo means and pick-off subject both to the differential pressure created by said pick-off and the counter fluid pressure in said servo means, and means for varying the effective air pressure, whereby the hydraulic pressure supplied to the servo means may be adjusted indirectly.

THEODORE W. KENYON.
STEPHEN J. ZAND.